(12) United States Patent
Sekino

(10) Patent No.: US 7,831,099 B2
(45) Date of Patent: Nov. 9, 2010

(54) PATTERN MATCHING DEVICE, IMAGE ENCODER, IMAGE DECODER, IMAGE PROCESSING SYSTEM, COMPUTER READABLE MEDIA STORING PROGRAMS, AND COMPUTER DATA SIGNAL

(75) Inventor: Masanori Sekino, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 975 days.

(21) Appl. No.: 11/648,685

(22) Filed: Jan. 3, 2007

(65) Prior Publication Data
US 2007/0280545 A1 Dec. 6, 2007

(30) Foreign Application Priority Data
Jun. 2, 2006 (JP) ............................. 2006-154575

(51) Int. Cl.
*G06K 9/68* (2006.01)
*G06K 9/42* (2006.01)
*G06K 9/56* (2006.01)

(52) U.S. Cl. ........................ 382/218; 382/257; 382/308

(58) Field of Classification Search ................. 382/218, 382/220, 256, 257, 190, 200, 203, 243, 308
See application file for complete search history.

(56) References Cited

U.S. PATENT DOCUMENTS

| | | | | |
|---|---|---|---|---|
| 5,091,966 A | * | 2/1992 | Bloomberg et al. | ......... 382/203 |
| 5,539,841 A | * | 7/1996 | Huttenlocher et al. | ....... 382/218 |
| 6,064,769 A | * | 5/2000 | Nakao et al. | ................ 382/224 |
| 2008/0199081 A1 | * | 8/2008 | Kimura et al. | .............. 382/190 |

FOREIGN PATENT DOCUMENTS

| | | |
|---|---|---|
| JP | A 07-200745 | 8/1995 |
| JP | A 09-147108 | 6/1997 |

* cited by examiner

*Primary Examiner*—Yon Couso
(74) *Attorney, Agent, or Firm*—Oliff & Berridge, PLC

(57) ABSTRACT

A pattern matching device includes a dilated image generating unit that generates a dilated image based on a resultant image obtained by logical operation between a first image pattern and a second image pattern, and a comparing unit that compares the first image pattern with the second image pattern, based on a ratio of overlap between the first image pattern and the dilated image generated by the dilated image generating unit, and a ratio of overlap between the second image pattern and the dilated image generated by the dilated image generating unit.

10 Claims, 10 Drawing Sheets

PATTERN MATCHING DEVICE 10,
IMAGE ENCODER 2,
IMAGE DECODER 3

INPUT IMAGE

PATTERN DICTIONARY

POSITION OF PATTERN

S10 PATTERN MATCHING PROCESS

IMAGE ENCODING PROCESS
S20

IMAGE DECODING PROCESS
S30

PATTERN MATCHING DEVICE, IMAGE ENCODER, IMAGE DECODER, IMAGE PROCESSING SYSTEM, COMPUTER READABLE MEDIA STORING PROGRAMS, AND COMPUTER DATA SIGNAL

BACKGROUND

1. Technical Field

The present invention relates to a pattern matching device that subjects binary images to a matching process, as well as an image encoder, an image decoder, an image processing system, and computer readable media storing programs, and a computer data signal.

2. Related Art

An image encoding method is publicly known, which extracts a pattern, such as a character or a graphic element that repeatedly appears in an input image, creates an image dictionary, and then an appearance position of the pattern and the dictionary are encoded. An example of this method is a text encoding process according to JBIG2. In addition, a method described below is taken up as an example of a pattern matching process using dilation.

SUMMARY

According to an aspect of the present invention, there is provided a pattern matching device including a dilated image generating unit that generates a dilated image based on a resultant image obtained by logical operation between a first image pattern and a second image pattern, and a comparing unit that compares the first image pattern with the second image pattern, based on a ratio of overlap between the first image pattern and the dilated image generated by the dilated image generating unit, and a ratio of overlap between the second image pattern and the dilated image generated by the dilated image generating unit.

BRIEF DESCRIPTION OF THE DRAWINGS

An exemplary embodiment of the present invention will be described in detail based on the following figures, wherein:

FIG. 6A illustrates an accepted binary input image, FIG. 6B illustrates a pattern dictionary 44 generated based on the input image, and FIG. 6C illustrates information regarding image patterns extracted from the input image;

DETAILED DESCRIPTION

In order to facilitate the understanding of the present invention, a background and overview thereof will be explained.

As a first way of a pattern matching process, there is a method that prepares a dilated image and an eroded image of a reference pattern, and determines whether or not an input image matches the reference pattern, by checking the input image that covers the eroded image without extending off the dilated image. However, since the reference pattern is fixed, this method is not applicable when arbitrary patterns should be checked. Furthermore, since the reference pattern and the input image are not handled symmetrically, there is a possibility that a result of matching (A, B) and a result of matching (B, A) may be different.

Figure 1A:
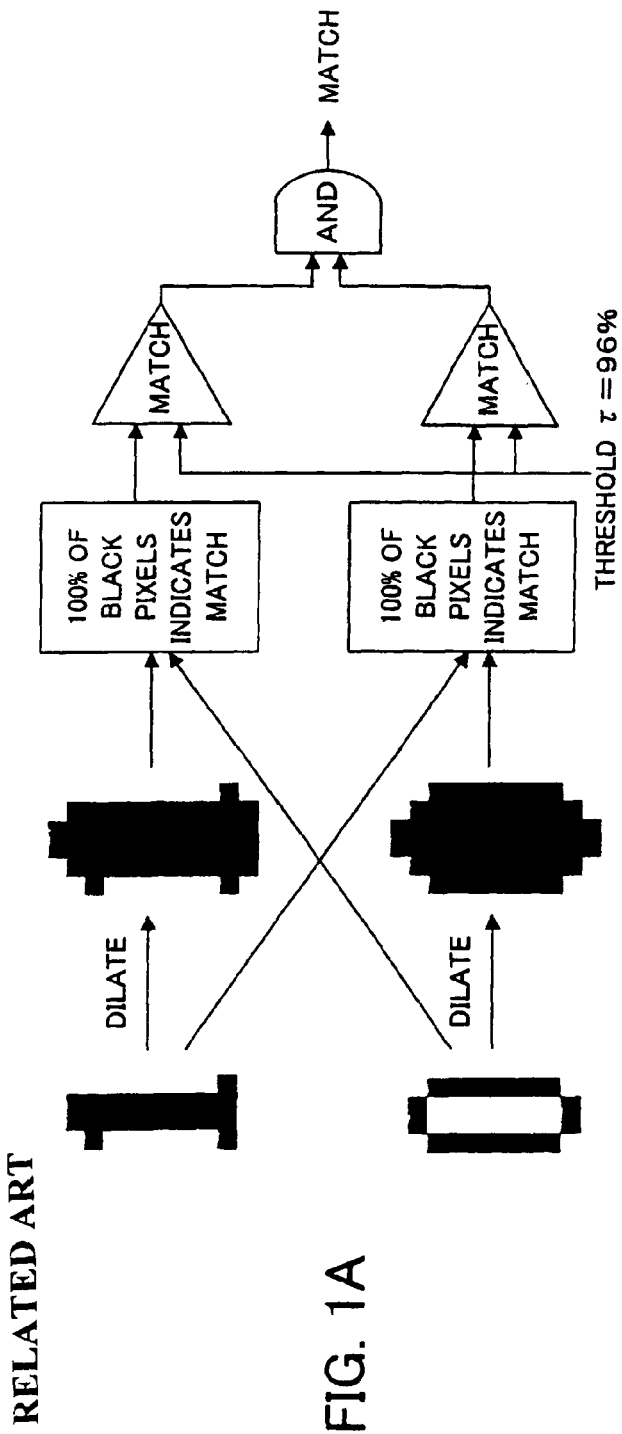
FIG. 1A, FIG. 1B, and FIG. 1C illustrate a method how the pattern matching is performed by applying the dilation process to each of two patterns.
Figure 1B:
Figure 1C:
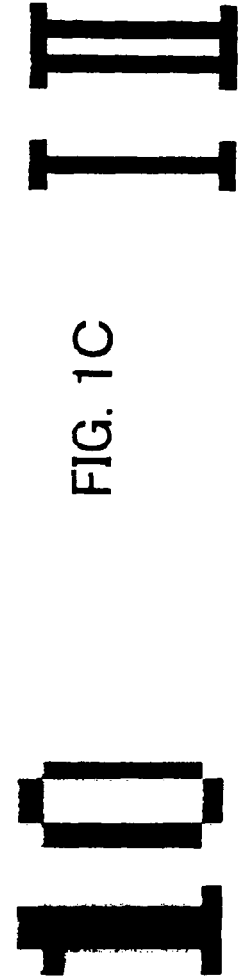

As a second way of a pattern matching process, there is a method that performs a pattern matching by use of dilated images that are obtained by applying a dilation process to each of two patterns as comparison targets. FIG. 1A, FIG. 1B, and FIG. 1C illustrate a method of how the pattern matching is performed by applying the dilation process to each of two patterns.

As shown in FIG. 1A, two patterns (in the example, "1" and "0") are each subjected to the dilation process, and two dilated images are generated. Next, a ratio of overlap where the first comparison target "1" matches the dilated image of the second comparison target pattern "0". Specifically, a ratio of black pixels of the pattern "1" that is covered by black pixels of the dilated image of the pattern "0" is calculated. In the present example, 100% of the black pixels of the pattern "1" are covered by the black pixels of the dilated image of the pattern "0".

Similarly, a ratio of overlap where the second comparison target "0" matches the dilated image of the first comparison target pattern "1". In the present example, 100% of the black pixels of the pattern "0" are covered by the black pixels of the dilated image of the pattern "1". If both of the ratios having been calculated are equal to or more than a predetermined threshold (e.g. τ=96%), it is determined that there is a match between two patterns.

With such a pattern matching method as described above, even though fine lines respectively of different two patterns may be in a positional relationship, for example, deviated from each other with a difference of approximately one pixel, it may be determined that there is a match therebetween due to the dilation process applied to the two patterns. For example, if the two patterns are "1" and "0" as shown in FIG. 1B, or if the two patterns are "I" and "II" as shown in FIG. 1C, it may be determined that there is a match between the two patterns, even though the two patterns as comparison targets are different.

Figure 2:
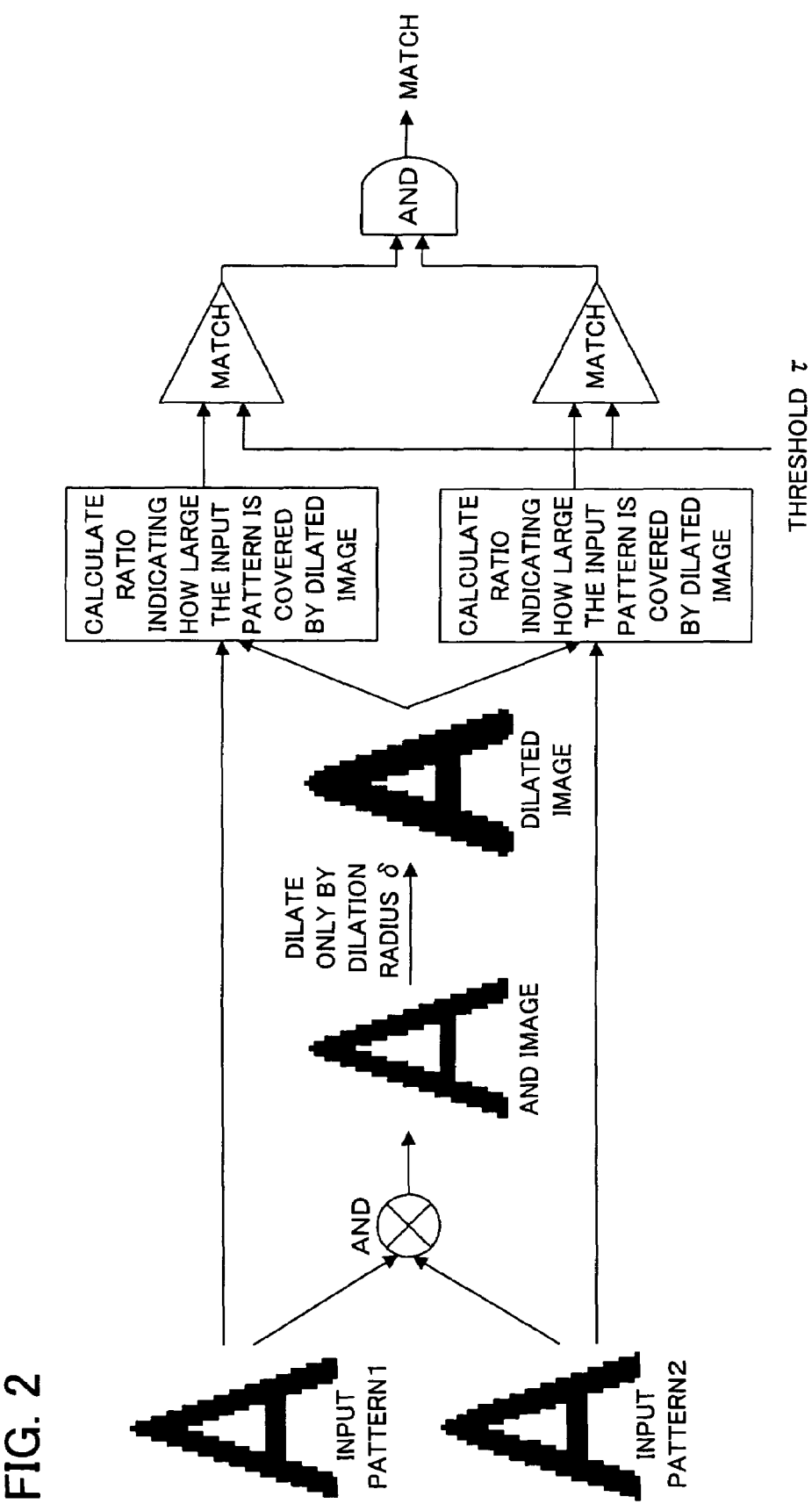
FIG. 2 schematically illustrates the pattern matching by the pattern matching device according to an aspect of the present invention.

FIG. 2 schematically illustrates the pattern matching by the pattern matching device according to an aspect of the present invention.

As shown in FIG. 2, in the pattern matching device according to an aspect of the present invention, firstly, logical operations are performed for a first image pattern (input pattern 1) and a second image pattern (input pattern 2), and a third image pattern is generated as a resultant image of the logical operations. For example, the first image pattern and the second image pattern are binary images, and these image patterns are subjected to the logic operation AND (AND operation), thereby generating an AND image.

Next, a dilated image is generated based on the resultant image obtained by the logical operation. For instance, the dilated image is generated by dilating black pixels of the resultant image obtained by the logical operation, using a dilation radius δ. Furthermore, according to the ratio of overlap between the first image pattern and the generated dilated image, and the ratio of overlap between the second image pattern and the generated dilated image, the first image pattern and the second image pattern are compared with each other.

Specifically, when any one of the ratios of overlaps between the first image pattern and the generated dilated image, and between the second image pattern and the generated dilated image, is less than a predetermined threshold, it is determined that the first image pattern and the second image pattern are different image patterns. On the other hand, if both of the ratios of overlaps between the first image pattern and the generated dilated image, and between the second image pattern and the generated dilated image, are equal to or more than a predetermined threshold, it is determined that the first image pattern matches the second image pattern. For example, a ratio of the black pixels of the first image pattern, which is covered by the black pixels of the dilated image, and a ratio of the black pixels of the second image pattern, which is covered by the black pixels of the dilated image, are calculated, and each of the calculated ratios is compared with the threshold τ, thereby determining whether or not the first image pattern matches the second image pattern.

When the first image pattern and the second image pattern are subjected to the logical operation, a process for aligning the two image patterns is performed. This alignment process is performed by obtaining centers of the two patterns and aligning the centers. The center of each pattern may be obtained by calculating the center of the image pattern according to the width and the height of the image pattern. Alternatively, it may be obtained by calculating a gravity point of the image pattern. Similarly, this alignment process is also performed in the case where ratios of overlaps between the first image pattern and the dilated image and between the second image pattern and the dilated image are calculated.

Hereinafter, there will be explained a pattern matching device 10, an image encoder 2 including the pattern matching device 10, an image decoder 3 that generates a decoded image by decoding the encoded data having been encoded by the image encoder 2, and an image processing system having the image encoder 2 and the image decoder 3, according to an exemplary embodiment of the present invention.

Figure 3:
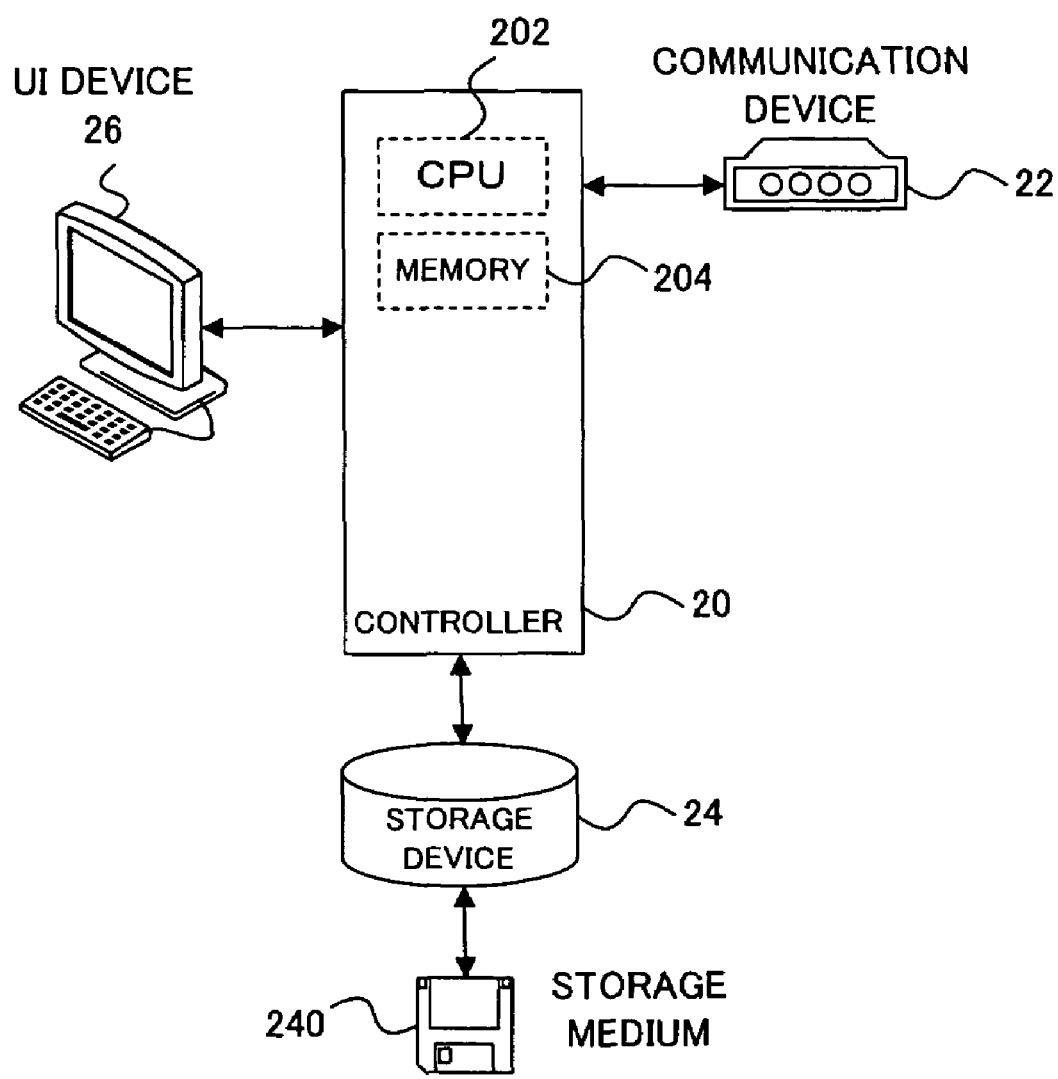
FIG. 3 illustrates a hardware configuration of a pattern matching device 10, an image encoder 2, and an image decoder 3, according to an aspect of the present invention, centering on a controller 20.

FIG. 3 illustrates a hardware configuration of the pattern matching device 10, image encoder 2, and image decoder 3 according to an exemplary embodiment of the present invention, centering on a controller 20.

As shown in FIG. 3, the image encoder 2 and the like, are provided with the controller 20 including a CPU 202, a memory 204, and the like, a communication device 22 that sends data to and receives data from an external computer and the like via the network, a storage device 24 such as hard disk drive, and a user interface (UI) device 26 including a display such as a liquid crystal display, a keyboard, and a pointing device.

The image encoder 2 and the like, are general-use computers, for instance, having an image encoding program 4 and an image decoding program 5 described below being installed respectively, and obtaining image data via the communication device 22, storage device 24, a storage medium 240, and the like, and encodes or decodes the data being obtained. It is to be noted that the image encoder 2 may obtain image data that is optically read by a scanner function or a scanner device of a printer not illustrated.

Figure 4:
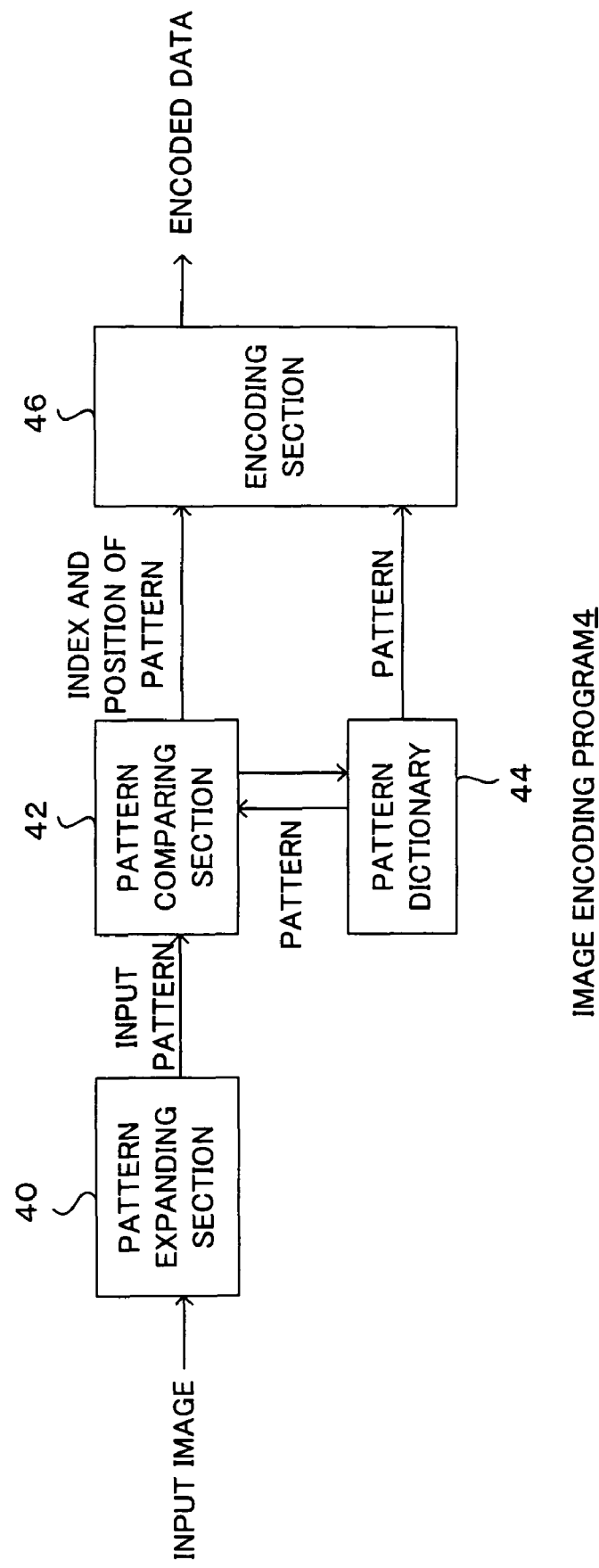
FIG. 4 illustrates a functional configuration of an image encoding program 4 that is executed by the controller 20 of the image encoder 2.

FIG. 4 illustrates a functional configuration of the image encoding program 4 that is executed by the controller 20 in the image encoder 2.

As shown in FIG. 4, the image encoding program 4 includes a pattern expanding section 40, pattern comparing section 42, pattern dictionary 44, and an encoding section 46. For instance, the image encoding program 4 is supplied to the controller 20, via the communication device 22, loaded on the memory 204, and executed by specific use of the hardware on the OS, not illustrated, which operates on the controller 20. The image encoding program 4 may also be stored in the recording medium 240 such as FD, CD, or DVD, and supplied to the image encoder 2. It is to be noted that the each program described below is supplied and executed in the similar manner. Furthermore, all or a part of functions of the image encoding program 4 may be implemented by ASIC or the like provided in the image encoder 2.

In the image encoding program 4, the pattern expanding section 40 accepts a binary input image via the communication device 22, the storage device 24, and the recording medium 240, extracts image patterns included in the input image, and outputs the extracted image patterns to the pattern comparing section 42. For instance, the pattern expanding section 40 cuts eight-neighbor-connected black pixels, as one pixel pattern, from the input image. Then, each of the cut-out pixel patterns is outputted to the pattern comparing section 42. As thus described, the pattern expanding section 40 configures an extracting component. It is to be noted here that the image pattern extracted by the pattern expanding section 40 is also referred to as "input pattern" in the following.

The pattern comparing section 42 performs a pattern matching process. Specifically, the pattern comparing section 42 inputs, as the input pattern, the image pattern extracted by the pattern expanding section 40, and reads an image pattern included in the pattern dictionary 44 described below. Then, the pattern comparing section 42 compares the extracted image pattern (the first image pattern) with the read image (the second image pattern). As a result of the comparing process based on the two patterns, if the pattern comparing section 42 determines that the two patterns are different from each other, the pattern comparing section 42 stores the image pattern extracted from the pattern expanding section 40 in the pattern dictionary 44.

The pattern comparing section 42 outputs to the encoding section 46, a position in the input image, of the image pattern being extracted by the pattern expanding section 40, and identification information of the image pattern included in the pattern dictionary 44. Here, the identification information of the image pattern is an index to uniquely identify the image pattern stored in the pattern dictionary 44. If the pattern comparing section 42 newly stores an image pattern that is not included in the pattern dictionary 44, an index in the pattern dictionary 44 for the image pattern newly stored is outputted to the encoding section 46. As for the pattern comparing section 42, a detailed explanation will be made later.

The pattern dictionary 44 stores plural image patterns being different from one another. Here, the image pattern may be a character or graphics. The pattern dictionary 44 is implemented by at least any one of the memory 204 and the storage device 24.

The encoding section 46 generates encoded data, by encoding information regarding the image pattern included in the pattern dictionary 44 and information regarding the image pattern extracted by the pattern expanding section 40. The encoding section 46 may store the encoded data in the storage device 24, or transmit the encoded data via the communication device 22 to an external computer such as an image decoder 3 described below. It is further possible to store the encoded data in the recording medium 240 to be supplied to the image decoder 3.

Specifically, the encoding section 46 accepts, from the pattern comparing section 42, a position in the input image, of the image pattern extracted from the input image, and an index of the image pattern in the pattern dictionary 44, and encodes those information elements. In addition, the encoding section 46 reads an image pattern from the pattern dictionary 44, and encodes an image of this image pattern. In this way, the encoding section 46 configures the pattern encoding component.

Figure 5:
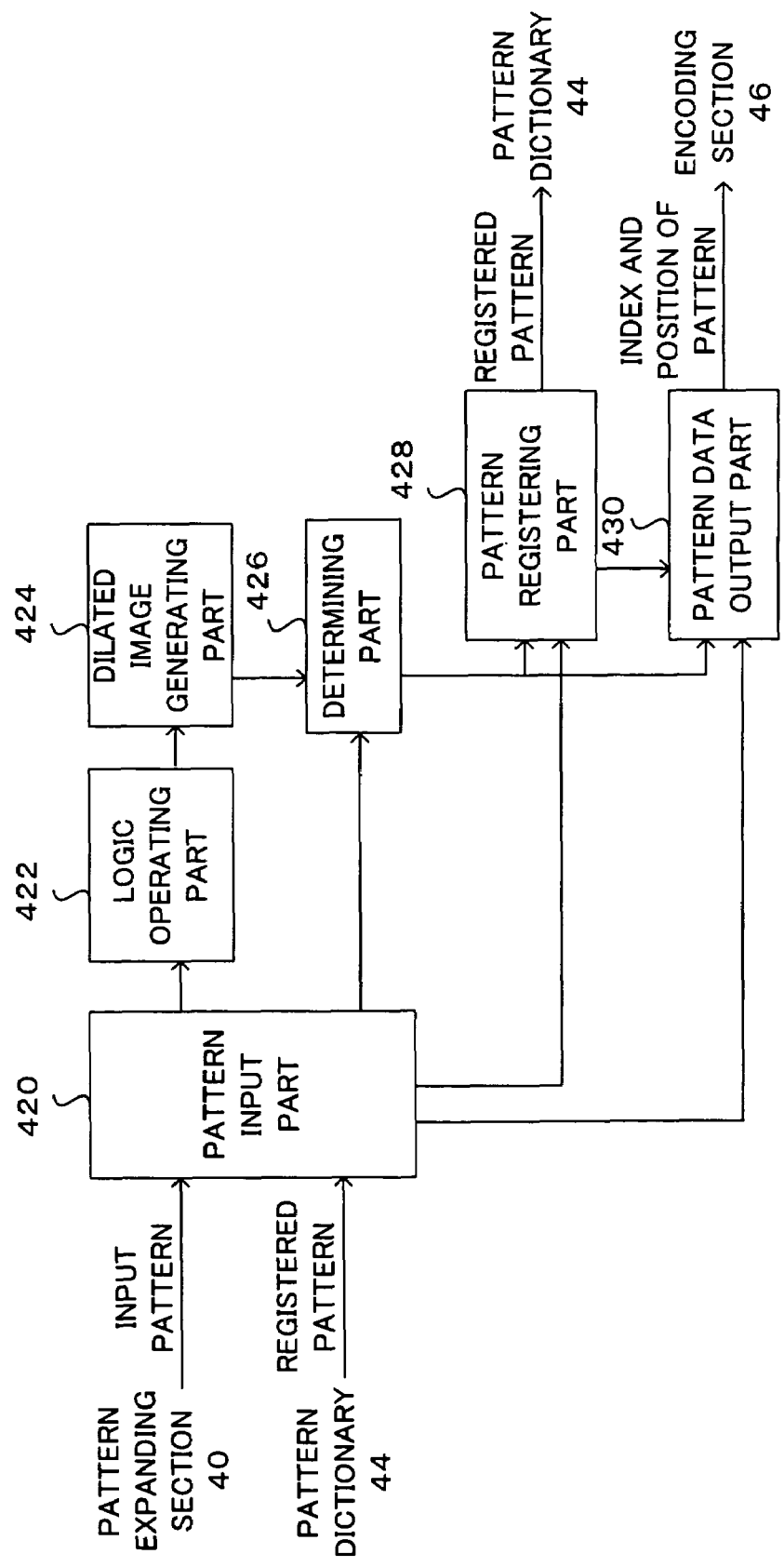
FIG. 5 illustrates a detailed functional configuration of a pattern comparing section 42 of the image encoding program 4.

FIG. 5 illustrates a detailed functional configuration of the pattern comparing section 42 of the image encoding program 4.

As shown in FIG. 5, the pattern comparing section 42 includes a pattern input part 420, a logical operating part 422, a dilated image generating part 424, a determining part 426, a pattern registering part 428, and a pattern data output part 430.

In the pattern comparing section 42, when the pattern input part 420 inputs the image pattern (input pattern) extracted by the pattern expanding section 40, an image pattern included in the pattern dictionary 44 is read out. Then, those image patterns are outputted to the logical operating part 422 and the determining part 426. The pattern input part 420 outputs information regarding the input pattern to the pattern registering part 428 and the pattern data output part 430. Hereinafter, an image pattern stored in the pattern dictionary 44 will also be referred to as "registered pattern".

The logical operating part 422 performs an alignment process between the input pattern and the registered pattern, subjects the input pattern and the registered pattern to a logical operation, and outputs a resultant image to the dilated image generating part 424. Specifically, the logical operating part 422 obtains a center of the two patterns based on the middle point or gravity point between the input pattern and the registered pattern, so as to perform the alignment process. The logical operating part 422 performs AND operation on the two aligned patterns, to generate a resultant image. In other words, black pixels in the resultant image are generated at a location where both of the input pattern and the registered pattern show the black pixels. It is to be noted that the logical operation is not limited to the AND operation but it may be another type of logical operation such as EXCLUSIVE-OR operation, for instance.

The dilated image generating part 424 generates a dilated image based on the resultant image obtained by the logical operation, which is accepted from the logic operating part 422, and outputs the dilated image to the determining part 426. Specifically, the dilated image generating part 424 dilates the black pixels of the resultant image obtained by the logical operation, by use of a dilation radius $\delta$ (e.g., $\sqrt{2}$). Therefore, a line thickness of the dilated image is larger than the line thickness of the resultant image obtained by the logical operation. It is to be noted that $\delta$ may be preset, or inputted by the user via the UI device 26.

The determining part 426 compares the input pattern with the registered pattern, determines whether or not the two image patterns are different from each other, and outputs a determination result to the pattern registering part 428 and the pattern data output part 430. Specifically, the determining part 426 calculates a ratio of overlap between the input pattern and the dilated image, and also calculates a ratio of overlap between the registered pattern and the dilated image. On the basis of these ratios, the input pattern and the registered pattern are compared. In this way, the determining part 426 configures the comparing component.

More specifically, the determining part 426 determines that the input pattern is different from the registered pattern, if at least one of the ratio of overlap between the input pattern and the dilated image and the ratio of overlap between registered pattern and the dilated image, is less than is predetermined threshold $\tau$ (e.g., $\tau=96\%$). Furthermore, the determining part 426 determines that the input pattern matches the registered pattern, if both of the ratio of overlap between the input pattern and the dilated image and the ratio of overlap between registered pattern and the dilated image are equal to or more than the predetermined threshold. Here, the ratio of overlap indicates a ratio of the black pixels of the input pattern, which is covered by the black pixel of the dilated image or a ratio of the black pixels of the registered pattern, which is covered by the black pixel of the dilated image. It is to be noted that the threshold $\tau$ may be preset, or specified via the UI device 26, by inputting from a user.

The pattern registering part 428 registers, in the pattern dictionary 44, the input pattern accepted from the pattern input part 420 based on the determination result by the determining part 426. Specifically, when the determining part 426 determines that the input pattern and the registered pattern are different image patterns, the pattern registering part 428 stores the input pattern as a registered pattern in the pattern dictionary 44. When the input pattern is newly registered, the pattern registering part 428 gives the input pattern and an index that uniquely identifies the input pattern, and stores the input pattern with the index in the pattern dictionary 44. In this way, the pattern registering part 428 configures the storing component.

On the basis of the determination result by the determining part 426, the pattern data output part 430 outputs, to the encoding section 46, a position of the input pattern in the input image, and the index of the input pattern in the pattern dictionary 44. Specifically, when the determining part 426 determines that the input pattern matches the registered pattern, the pattern data output part 430 outputs, to the encoding section 46, the position of the input pattern accepted from the pattern input part 420 and the index of the input pattern. On the other hand, when the determining part 426 determines that the input pattern and the registered pattern are different image patterns, the pattern data output part 430 outputs, to the encoding section 46, the position of the input pattern accepted from the pattern input part 420 and the index of the input pattern, which is newly given by the pattern registering part 428.

In the exemplary embodiment of the present invention, the image encoding program 4 includes a pattern matching program. Here, the pattern matching program includes the logic operating part 422, dilated image generating part 424, and determining part 426. The pattern matching program may also be installed and operated in the pattern matching device 10, independently of the image encoding program 4.

Figure 6A:
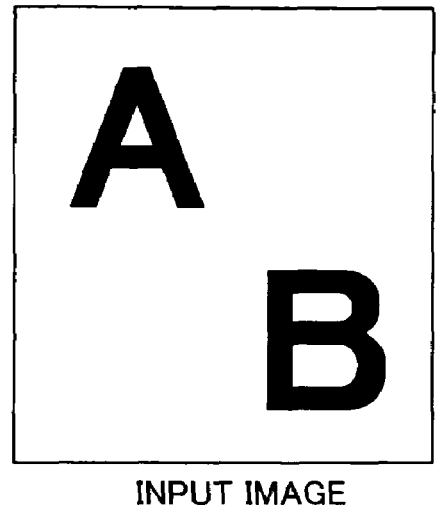
FIGS. 6A to 6C illustrate a process for encoding information regarding an image pattern.
Figure 6B:
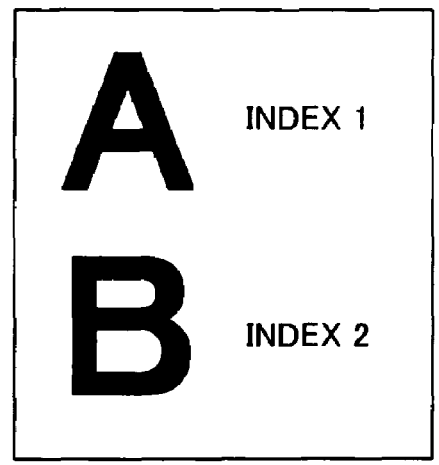
Figure 6C:
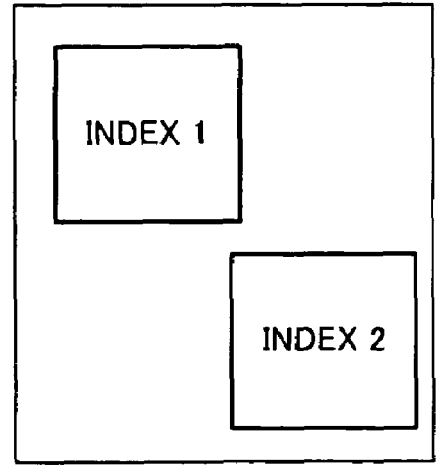

FIG. 6 illustrates a process that encodes information regarding an image pattern, and FIG. 6A illustrates an accepted binary input image, FIG. 6B illustrates a pattern dictionary 44 generated based on the input image, and FIG. 6C illustrates information regarding image patterns extracted from the input image.

As illustrated in FIG. 6A and FIG. 6B, image patterns ("A" and "B" in the present example) included in the input image are extracted by the image encoding program 4, and stored in the pattern dictionary 44 as image patterns different from each other. Each of the image patterns is given an index. A shape of the image pattern is encoded by the encoding section 46 as information regarding the image pattern included in the pattern dictionary 44.

As illustrated in FIG. 6C, the encoding section 46 encodes the position of the image pattern in the input image and the index of the image pattern, as information regarding the image pattern extracted by the pattern expanding section 40. The encoding section 46 encodes the information regarding the image pattern included in the pattern dictionary 44 and the information regarding the image pattern extracted by the pattern expanding section 40, thereby generating encoded data. It is to be noted that the encoding section 46 may encode only the information regarding the image pattern extracted by the pattern expanding section 40 to generate the encoded data.

Figure 7:
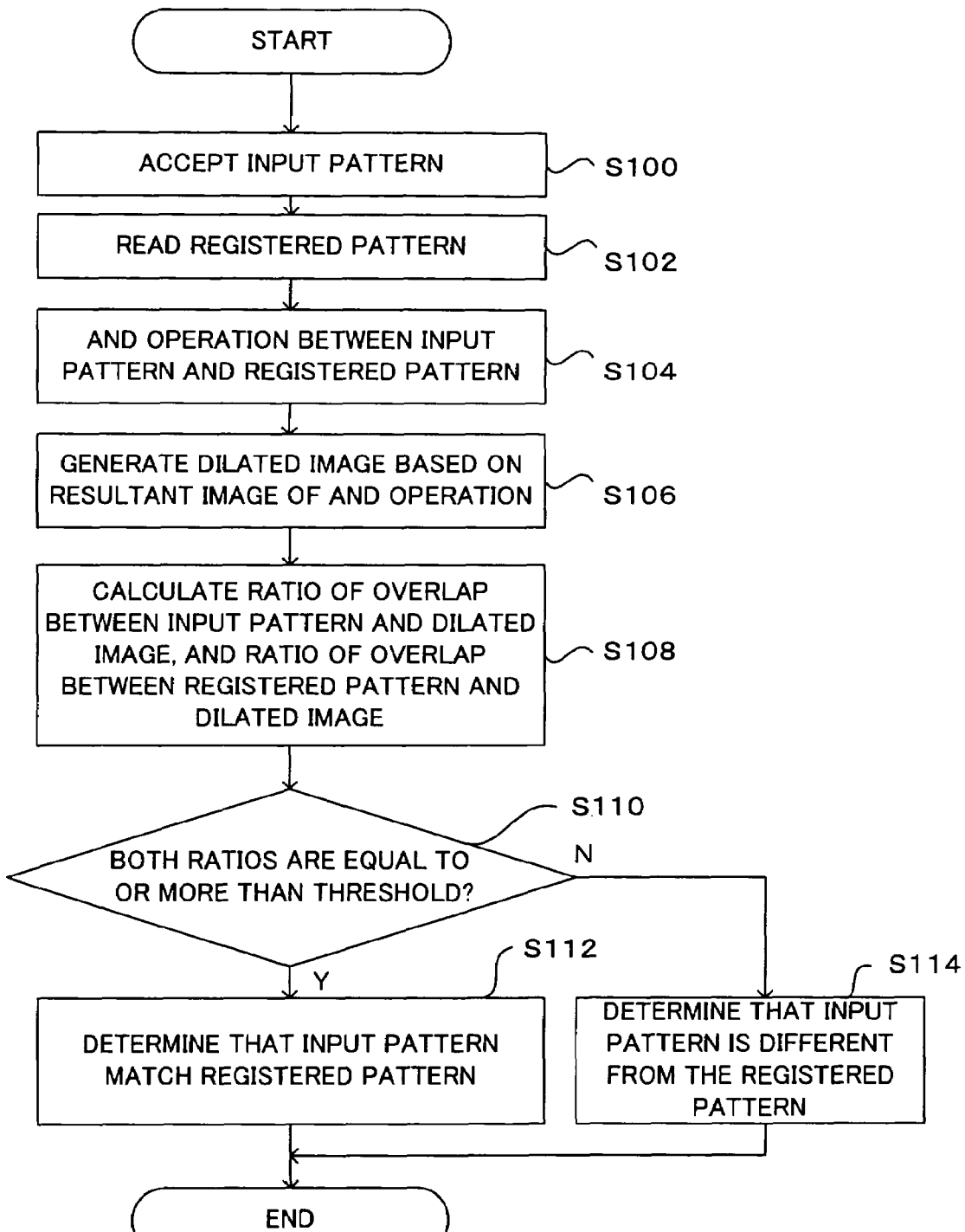
FIG. 7 is a flowchart showing the pattern matching process (S10) by the pattern comparing section 42 of the image encoding program 4.

FIG. 7 is a flowchart showing the pattern matching process (S10) by the pattern comparing section 42 of the image encoding program 4.

As shown in FIG. 7, in step 100 (S100), the pattern input part 420 of the pattern comparing section 42 accepts the first image pattern (input pattern) extracted from the input image by the pattern expanding section 40.

In step 102 (S102), the pattern input part 420 reads the second image pattern (registered pattern) included in the pattern dictionary 44. The pattern input part 420 outputs these two patterns to the logic operating part 422.

In step 104 (S104), the logic operating part 422 subjects the input pattern and the registered pattern to AND operation, and outputs a resultant image obtained by the logical operation to the dilated image generating part 424.

In step 106 (S106), the dilated image generating part 424 generates a dilated image based on the resultant image obtained by the logical operation, and outputs the dilated image to the determining part 426.

In step 108 (S108), the determining part 426 calculates a ratio of overlap between the input pattern accepted from the pattern input part 420 and the dilated image accepted from the dilated image generating part 424, and a ratio of overlap between the registered pattern and the dilated image accepted from the dilated image generating part 424.

In step 110 (S110), the determining part 426 determines whether or not both the calculated ratios are equal to or more than a threshold. If the determining part 426 determines that both the calculated ratios are equal to or more than the threshold, the processing proceeds to S112. Otherwise, the processing proceeds to S114.

In step 112 (S112), the determining part 426 determines that the input pattern matches the registered pattern.

On the other hand, in step 114 (S114), the determining part 426 determines that the input pattern and the registered pattern are image patterns different from each other.

In this manner, the determining part 426 compares the input pattern with the registered pattern, based on the ratios of overlaps between the input pattern and the dilated image, and between the registered pattern and the dilated image.

Figure 8:
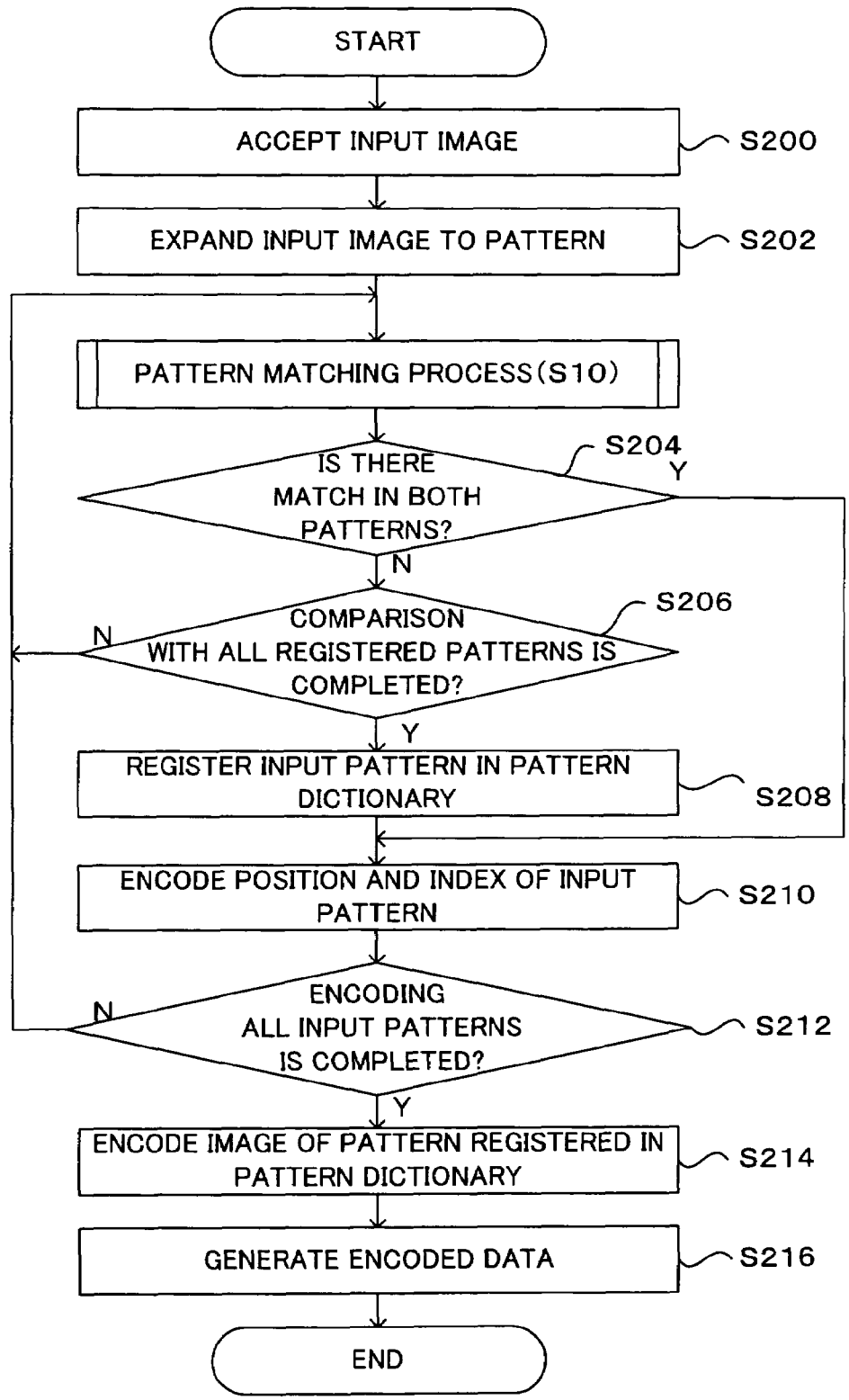
FIG. 8 is a flowchart showing the image encoding process (S20) according to the image encoding program 4.

FIG. 8 is a flowchart showing the image encoding process (S20) according to the image encoding program 4 including the pattern matching process as described above.

As shown in FIG. 8, in step 200 (S200), the pattern expanding section 40 of the image encoding program 4 accepts the input image.

In step 202 (S202), the pattern expanding section 40 expands the input image to individual image patterns, extracts the image patterns, and outputs each of the extracted image patterns to the pattern comparing section 42.

Upon accepting the image patterns from the pattern expanding section 40, the pattern comparing section 42 performs the pattern matching process (FIG. 7; S10).

In the step 204 (S204), the determining part 426 of the pattern comparing section 42 determines whether or not the input pattern matches the registered pattern. If there is a match between these patterns, the next step of the image encoding program 4 is S210. Otherwise, the next step is S206.

In step 206 (S206), the pattern input part 420 of the pattern comparing section 42 determines whether or not comparison between each of all the registered patterns and the input pattern has been completed. If comparison with all the registered patterns has been completed, the next step of the image encoding program 4 is S208. Otherwise, the pattern input part 420 reads the next registered pattern included in the pattern dictionary 44, and outputs the read registered pattern to the logic operating part 422. In this manner, the image encoding program 4 returns to the pattern matching process (S10).

On the other hand, if it is determined that the input pattern is different from any of the registered patterns even after the pattern matching process has been completed as to all the registered patterns, the pattern registering part 428 stores, in step 208 (S208), this input pattern in the pattern dictionary 44, and gives an index to the input pattern.

In step 210 (S210), the pattern data output part 430 outputs, to the encoding section 46, a position of the input pattern in the input image, and the index of the input pattern. Upon accepting the information regarding the input pattern, the encoding section 46 encodes this information.

In step 212 (S212), the pattern input part 420 of the pattern comparing section 42 determines whether or not all the input patterns being extracted have been encoded. If all the input patterns are encoded, the next step of the image encoding program is S214. Otherwise, the pattern comparing section 42 performs the pattern matching process (S10) for the next input pattern.

In step 214 (S214), the encoding section 46 reads an image pattern included in the pattern dictionary 44, and encodes the image.

In step 216 (S216), on the basis of the data obtained by encoding the information regarding the image pattern included in the pattern dictionary 44, and the data obtained by encoding the information regarding the input pattern extracted from the input image, the encoding section 46 generates and outputs the encoded data.

Figure 9:
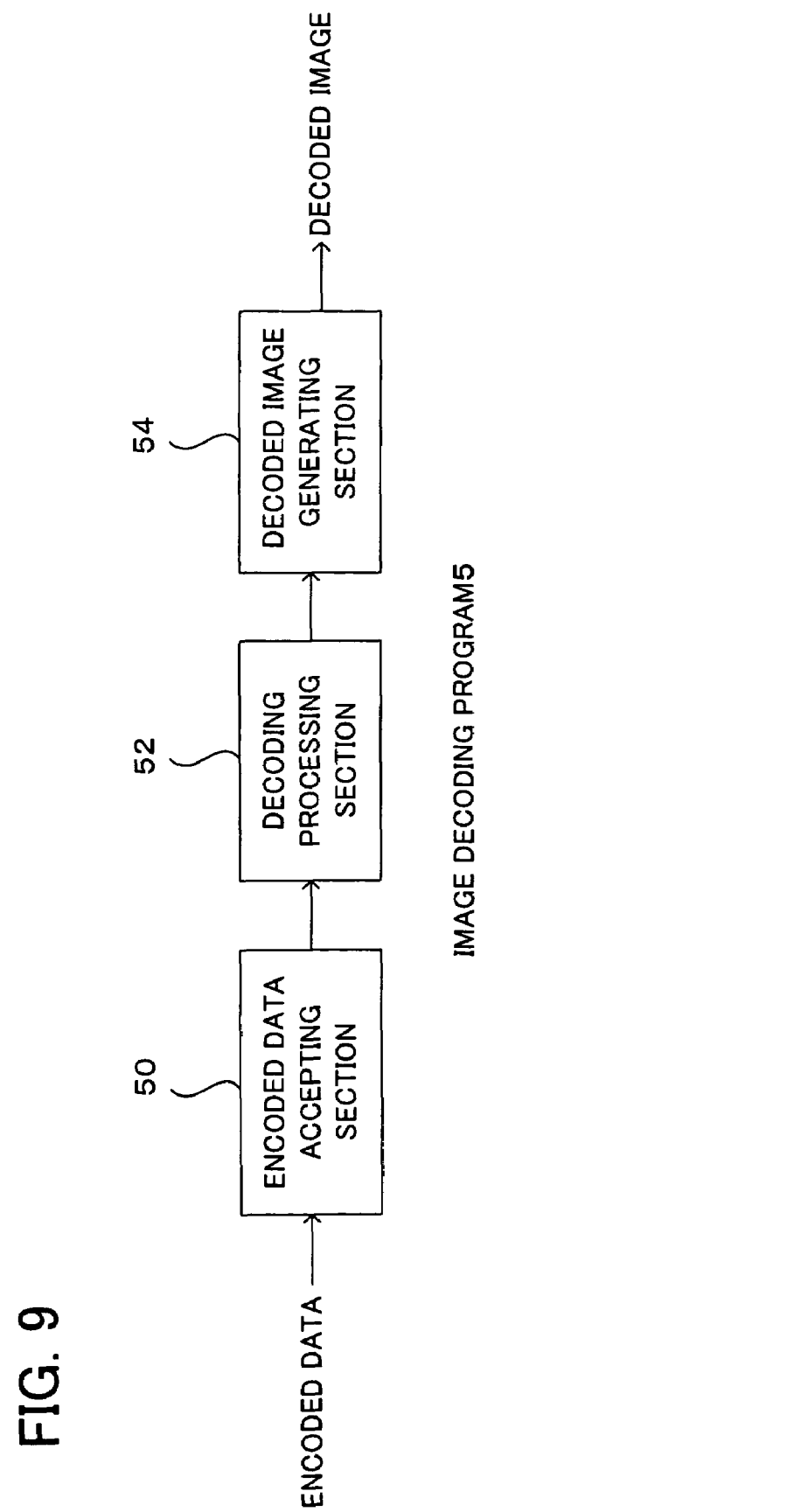
FIG. 9 illustrates a functional configuration of an image decoding program 5 that is executed by the controller 20 of the image decoder 3.

FIG. 9 illustrates a functional configuration of the image decoding program 5 that is executed by the controller 20 of the image decoder 3.

As illustrated in FIG. 9, the image decoding program 5 includes an encoding data accepting section 50, a decoding processing section 52, and a decoded image generating section 54. With the configuration above, the image decoding program 5 accepts encoded data that is encoded by the image encoder 2 as described above, and decodes the data to generate a decoded image.

In the image decoding program 5, the encoded data accepting section 50 accepts the encoded data that is encoded by the image encoder 2, and outputs the data to the decoding processing section 52.

The decoding processing section 52 decodes the encoded data accepted by the encoded data accepting section 50, and outputs, to the decoded image generating section 54, information regarding the image pattern included in the pattern dictionary 44, the position of the image pattern and the index thereof.

The decoded image generating section 54 generates a decoded image based on the information decoded by the decoding processing section 52. Specifically, on the basis of the position and the index of the image pattern, the decoded image generating section 54 arranges the image pattern identified by the index on that position, thereby generating the decoded image.

Figure 10:
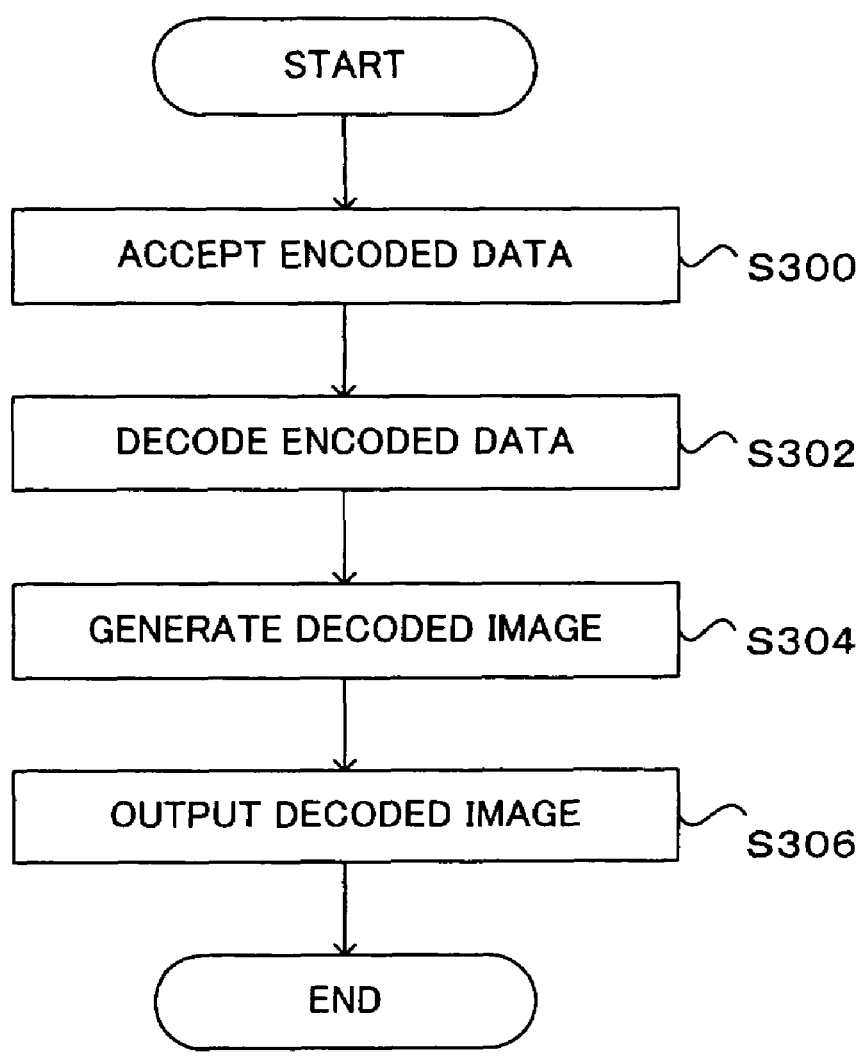
FIG. 10 is a flowchart showing the image decoding process (S30) according to the image decoding program 5.

FIG. 10 is a flowchart showing the image decoding process (S30) according to the image decoding program 5.

As illustrated in FIG. 10, in step 300 (S300), the encoded data accepting section 50 of the image decoding program 5 accepts the encoded data.

In step 302 (S302), the decoding processing section 52 decodes the accepted encoded data.

In step 304 (S304), the decoded image generating section 54 generates a decoded image based on the decoded data.

In step 306 (S306), the decoded image generating section 54 outputs the generated decoded image.

The image processing system according to the exemplary embodiment of the present invention includes the image encoder 2 and the image decoder 3 as described above. In the image processing system, the image encoder 2 and the image decoder 3 are connected via a network or the like, not illustrated. The encoded data and the like are sent and received between the image encoder 2 and the image decoder 3, via the communication device 22 of the image encoder 2 and the like.

It is to be noted that the image encoder 2 and the image decoder 3 may be contained within an identical enclosure. In addition, the image encoding program 4 and the image decoding program 5 may be operated on an identical computer.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pattern matching device, comprising:
a dilated image generating unit that generates a dilated image based on a resultant image obtained by logical operation between a first image pattern and a second image pattern, and
a comparing unit that compares the first image pattern with the second image pattern, based on a ratio of overlap between the first image pattern and the dilated image generated by the dilated image generating unit, and a ratio of overlap between the second image pattern and the dilated image generated by the dilated image generating unit.

2. The pattern matching device according to claim 1, wherein the first image pattern and the second image pattern are binary images, and
the dilated image generating unit subjects a resultant image of AND operation between the first image pattern and the second image pattern to a dilation process.

3. The pattern matching device according to claim 1, wherein the comparing unit determines that the first image pattern and the second image pattern are image patterns different from each other if one of the ratio of overlap between the first image pattern and the dilated image being generated by the dilated image generating unit and the ratio of overlap between the second image pattern and the dilated image being generated by the dilated image generating unit is less than a predetermined threshold.

4. The pattern matching device according to claim 2, wherein the comparing unit determines that the first image pattern and the second image pattern are image patterns different from each other if one of the ratio of overlap between the first image pattern and the dilated image being generated by the dilated image generating unit and the ratio of overlap between the second image pattern and the dilated image being generated by the dilated image generating unit is less than a predetermined threshold.

5. An image encoder, comprising:
a pattern dictionary including a plurality of image patterns different from one another,
an extracting unit that extracts an image pattern included in an input image,
a dilated image generating unit that generates a dilated image, based on a resultant image obtained by logical operation between the image pattern extracted by the extracting unit and one of the plurality of image patterns included in the pattern dictionary,
a storing unit that stores the image pattern extracted by the extracting unit in the pattern dictionary if it is determined that the image pattern extracted by the extracting unit and the one of the plurality of image patterns included in the pattern dictionary are image patterns different from each other, based on the ratio of overlap between the image pattern extracted by the extracting unit and the dilated image generated by the dilated image generating unit, and the ratio of overlap between the one of the plurality of image patterns included in the pattern dictionary and the dilated image generated by the dilated image generating unit, and
a pattern encoding unit that encodes information regarding the one of the plurality of image patterns included in the pattern dictionary and information regarding the image pattern extracted by the extracting unit.

6. An image decoder, comprising:
an accepting unit that accepts encoded data from an image encoder having a pattern dictionary including a plurality of image patterns different from one another, an extracting unit that extracts an image pattern included in an input image, a dilated image generating unit that generates a dilated image based on a resultant image obtained by logical operation between the image pattern extracted by the extracting unit and one of the plurality of image patterns included in the pattern dictionary, a storing unit that stores the image pattern extracted by the extracting unit in the pattern dictionary if it is determined that the image pattern extracted by the extracting unit and the one of the plurality of image patterns included in the pattern dictionary are image patterns different from each other, based on the ratio of overlap between the image pattern extracted by the extracting unit and the dilated image generated by the dilated image generating unit and the ratio of overlap between the one of the plurality of image patterns included in the pattern dictionary and the dilated image generated by the dilated image generating unit, and a pattern encoding unit that encodes information regarding the one of the plurality of image patterns included in the pattern dictionary and information regarding the image pattern extracted by the extracting unit,
a decoding unit that decodes the encoded data accepted by the accepting unit, and a decoded image generating unit that generates a decoded image based on the data decoded by the decoding unit.

7. An image processing system, comprising:
an image encoder including:
a pattern dictionary including a plurality of image patterns different from one another,
an extracting unit that extracts an image pattern included in an input image,
a dilated image generating unit that generates a dilated image, based on a resultant image obtained by logical operation between the image pattern extracted by the extracting unit and one of the plurality of image patterns included in the pattern dictionary,
a storing unit that stores the image pattern extracted by the extracting unit in the pattern dictionary if it is determined that the image pattern extracted by the extracting unit and the one of the plurality of image patterns included in the pattern dictionary are image patterns different from each other, based on the ratio of overlap between the image pattern extracted by the extracting unit and the dilated image generated by the dilated image generating unit, and the ratio of overlap between the one of the plurality of image patterns included in the pattern dictionary and the dilated image generated by the dilated image generating unit, and
a pattern encoding unit that encodes information regarding the one of the plurality of image patterns included in the pattern dictionary and information regarding the image pattern extracted by the extracting unit, and
an image decoder including:
a decoding unit that decodes the encoded data encoded by the image encoder, and
a decoded image generating unit that generates a decoded image based on the data decoded by the decoding unit.

8. A non-transitory computer readable medium storing a computer readable program executable by a computer for causing the computer that is included in a pattern matching device to execute a process comprising:
generating a dilated image based on a resultant image obtained by logical operation between a first image pattern and a second image pattern, and
comparing the first image pattern with the second image pattern, based on a ratio of overlap between the first image pattern and the generated dilated image, and a ratio of overlap between the second image pattern and the generated dilated image.

9. A non-transitory computer readable medium storing a computer readable program executable by a computer for causing the computer that is included in an image encoder to execute a process comprising:

a pattern dictionary including a plurality of image patterns different from one another,
extracting an image pattern included in an input image,
generating a dilated image, based on a resultant image obtained by logical operation between the extracted image pattern and one of the plurality of image patterns included in the pattern dictionary,
storing the extracted image pattern in the pattern dictionary if it is determined that the extracted image pattern and the one of the plurality of image patterns included in the pattern dictionary are image patterns different from each other, based on the ratio of overlap between the extracted image pattern and the generated dilated image, and the ratio of overlap between the one of the plurality of image patterns included in the pattern dictionary and the generated dilated image, and
encoding information regarding the one of the plurality of image patterns included in the pattern dictionary and information regarding the extracted image pattern.

10. A non-transitory computer readable medium storing a computer readable program executable by a computer for causing the computer that is included in an image decoder to execute a process comprising:
accepting encoded data that is encoded by an image encoder having a pattern dictionary including a plurality of image patterns different from one another, the image encoder executing a process including extracting an image pattern included in an input image, generating a dilated image based on a resultant image obtained by logical operation between the extracted image pattern and one of the plurality of image patterns included in the pattern dictionary, storing the extracted image pattern in the pattern dictionary, if it is determined that the image pattern being extracted and the one of the plurality of image patterns included in the pattern dictionary are image patterns different from each other, based on the ratio of overlap between the extracted image pattern and the generated dilated image, and the ratio of overlap between the one of the plurality of image patterns included in the pattern dictionary and the generated dilated image, and encoding information regarding the one of the plurality of image patterns included in the pattern dictionary and information regarding the extracted image pattern,
decoding the accepted encoded data, and
generating a decoded image based on the decoded data.

* * * * *